United States Patent [19]

Copeland

[11] 3,712,285
[45] Jan. 23, 1973

[54] METAL FOIL REFLECTOR HOLDER FOR COOKING GRILLS

[76] Inventor: Ernest Copeland, 7601 South Silver Road, Marine City, Mich. 48039

[22] Filed: Oct. 19, 1971

[21] Appl. No.: 190,488

[52] U.S. Cl. .................................126/9 R, 126/274
[51] Int. Cl. ......................A47j 37/00, F24c 1/16
[58] Field of Search.....126/9 R, 9 A, 25 R, 25 A, 29, 126/30, 274

[56] References Cited

UNITED STATES PATENTS

| | | | |
|---|---|---|---|
| 2,943,557 | 7/1960 | Suehlsen | 126/274 X |
| 3,537,388 | 11/1970 | Martin | 126/9 R X |
| 3,648,679 | 3/1972 | Quinn | 126/9 R X |

Primary Examiner—Charles J. Myhre
Attorney—Willis Bugbee et al.

[57] ABSTRACT

A pair of inverted U-shaped frames are disposed in horizontally-spaced parallel relationship by connecting bars at their lower ends. Each frame is provided with at least one cross bar having downwardly-inclined arms secured to the frame. A panel of flexible metal foil, such as aluminum foil, of sufficient stiffness to be self-sustaining,is arched between opposing cross bars of the same height. The holder is then placed over the grill or other cooking device above the heating means and above the article being cooked so as to reflect downward upon the food article being cooked the heat rising from the hot coals, charcoal or electrical heating unit of the cooking device. The lower ends of the frame are preferably pivoted to their respective connecting bars so as to enable the reflector holder to be folded flat substantially into one plane for storage or transportation.

7 Claims, 2 Drawing Figures

PATENTED JAN 23 1973   3,712,285
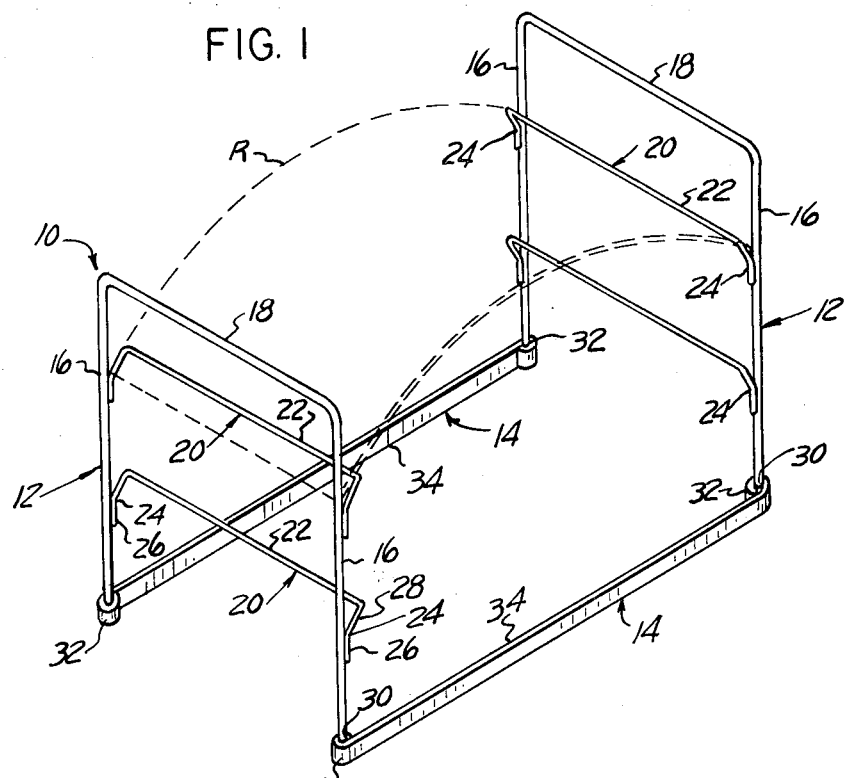
FIG. I
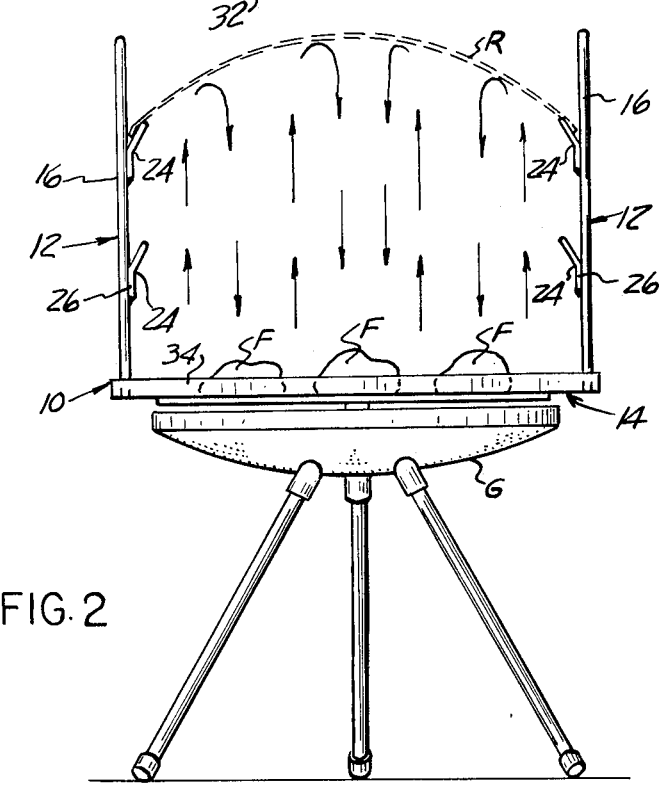
FIG. 2

METAL FOIL REFLECTOR HOLDER FOR COOKING GRILLS

SUMMARY OF THE INVENTION

This reflector holder amplifies the heat impinging upon the food article being cooked and prevents loss of much of the heat which would otherwise escape upward into the atmosphere, as more fully set forth in the specification below.

In the drawings,

FIG. 1 is a perspective view of a metal foil reflector holder according to one form of the invention, with the metal foil reflector shown in dotted lines; and FIG. 2 is a side elevation of the reflector holder shown in FIG. 1 in its position of use mounted upon an outdoor charcoal grill.

Referring to the drawing in detail, FIG. 1 shows a metal foil reflector holder, generally designated 10, according to one form of the invention as consisting of a pair of similar but oppositely-facing vertical end frames 12 disposed in spaced parallel relationship and interconnected at their lower ends by connecting bars 14. Each of the end frames 12 is of inverted approximately U-shaped form having side members 16 interconnected at their upper ends by cross members 18. The side members 16 and cross members 18 are preferably integral with one another and conveniently formed of heavy metal wire or rod stock.

Mounted on the end frames 12 at similar levels are one or more pairs of brackets 20 having cross members 22 terminating at their opposite ends in obtuse-angled end arms 24 welded or otherwise secured to the side members 16 of the end frames 12. These end arms 24 are composed of lower vertical attachment portions 26 and upper inclined portions 28 forming supports for a sheet of reflecting metal foil R, such as aluminum foil arched between the opposite end frames 12, as shown by the dotted lines in FIG. 1. The lower ends 30 of the side members 16 are preferably pivotally mounted in the hubs 32 formed by reversely bending the opposite ends of the intermediate portions 34 of the connecting bars 14. Because of the pivotal connections formed in the bent hubs 32, the reflector holder 10 can be folded substantially flat, after removing the metal foil reflector R, by swinging the end frames 12 around the hubs 32 into substantially the same plane for transportation or storage.

In the use of the invention, let it be assumed that the reflector holder 10 has been unfolded around the end frame pivot hubs 32 so as to swing the end frames 12 into the horizontally-spaced parallel positions shown in FIG. 1. The reflector holder 10, thus unfolded, is fitted with a sheet of bright metal foil R, such as aluminum foil, of sufficient stiffness to be self-supporting and of slightly greater length than the horizontal distance between the two end frames 12. The sheet of reflecting foil R is bent into an arch-shaped position by pushing its opposite ends toward one another, whereupon they are inserted between the brackets 20 and the end frames 12 as shown in FIG. 1. The reflector holder 10, thus equipped with the reflector F, is now placed upon the top of the grill G (FIG. 2) above the food article F being cooked on the bed of hot charcoal (not shown) therein. As a result, the heat coming upward from the hot coals of charcoal is intercepted by the reflector R and reflected downward as indicated by the arrows in FIG. 2, accelerating the cooking action and conserving heat and consequently saving fuel.

I claim:

1. A metal foil reflector holder for cooking grills, comprising a pair of end frames disposed in spaced parallel vertical positions,
    each end frame having a pair of laterally-spaced parallel vertical side members and a cross member interconnecting said side members at the upper ends thereof,
    each end frame having a reflector-sheet-holding bracket secured to said side members,
    and a pair of horizontal connecting members secured to the lower ends of said end frames.

2. A metal foil reflector holder, according to claim 1, wherein the brackets are inclined upward relatively to their respective end frames.

3. A metal foil reflector holder, according to claim 2, wherein each bracket includes an elongated cross bar having end arms extending downward therefrom to their respective end frames.

4. A metal foil reflector holder, according to claim 3, wherein said end arms are of obtuse-angled configuration with vertical lower portions secured to said end frames and wirh upwardly-inclined upper portions extending upward from said lower portions.

5. A metal foil reflector holder, according to claim 1, wherein said connecting members have hub portions at their opposite ends, and wherein said lower ends of said end frames are mounted in said hub portions.

6. A metal foil reflector holder, according to claim 5, wherein said lower ends of said end frames are pivotally mounted in their respective hub portions.

7. A metal foil reflector holder, according to claim 1, wherein each of said end frames has a second reflector-sheet-holding bracket secured to said side members at a different level from said first-mentioned reflector-sheet-holding bracket.

* * * * *